V. M. GRISWOLD.
Filtering and Pouring Bottle.
No. 85,088. Patented Dec. 22, 1868.
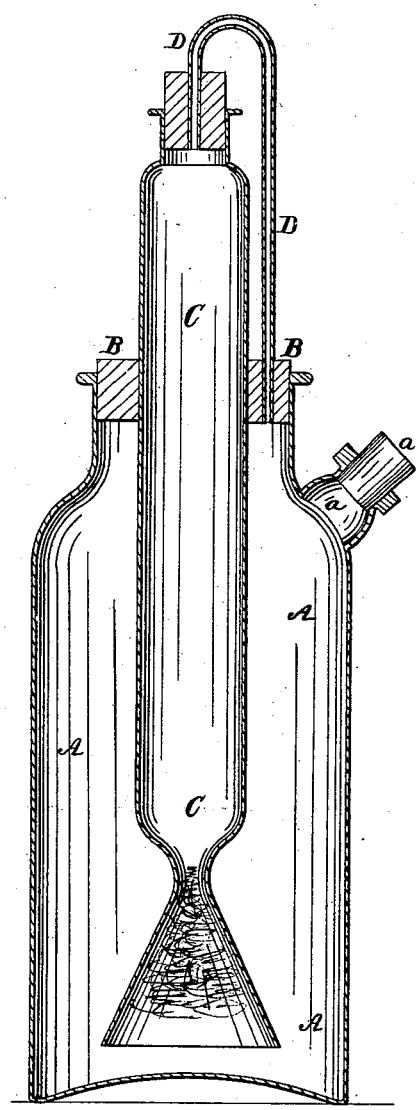
Witnesses:
Wm. A. Morgan
G. C. Cotter
Inventor:
V. M. Griswold
per Munn & Co. att'y

V. M. GRISWOLD, OF PEEKSKILL, NEW YORK.

Letters Patent No. 85,088, dated December 22, 1868.

IMPROVED FILTERING AND POURING-BOTTLE.

The Schedule referred to in these Letters Patent and making part of the same.

*To all whom it may concern:*

Be it known that I, V. M. GRISWOLD, of Peekskill, in the county of Westchester, and State of New York, have invented a new and useful Improvement in a Combined Filtering and Pouring-Bottle; and I do hereby declare that the following is a full, clear, and exact description thereof, which will enable others skilled in the art to make and use the same, reference being had to the accompanying drawings, forming part of this specification, in which the drawing represents a sectional elevation of my improved combined filtering and pouring-bottle.

Similar letters of reference indicate like parts.

The object of this invention is to construct a bottle for photographers', chemists', apothecaries', and others' use, which is so arranged, that in it the liquid is filtered, and that such filtered liquid can at the same time be, at will, poured out of the bottle.

The invention consists in fitting an open tube through the stopper of a larger bottle. The liquid to be filtered is poured into the larger bottle, and is, before it can ascend in the tube, filtered, so as to be pure when in the tube. It can then be conveniently poured out through the upper end of the tube, without interfering with the filtering-process.

Photographers have especially been annoyed by having to use a filtering-bottle and a pouring-bottle for the collodion, and other chemicals, and to them this invention will be of great value.

A, in the drawing, represents a bottle, made of glass or other suitable material, of suitable size and shape.

It is provided with an annular stopple, B, made of cork, glass, or other material.

Through the stopple B is fitted a tube, C, made of glass or other suitable material, of such length that it will reach nearly to the bottom of the bottle, and project above the stopple B, as shown.

The bottle A is provided with an additional supply-aperture, *a*, which is either arranged through its side, as shown, with a flange of suitable length, or which may be arranged through the stopple B, outside of the tube C.

Both the outer end of the tube C and the aperture *a* are closed by suitable stoppers.

The lower end of the tube C may be somewhat expanded, as shown, to hold, in the expanded part, the filtering-material, as indicated.

Such filtering-material may, instead of being in the tube, be arranged around the same, to form a partition in the annular space that is between the tube and bottle, or the filtering-material may be secured and arranged in any other suitable manner.

The liquid is poured into the bottle, passes through the filtering-material, and rises in the tube to the same height at which it stands in the bottle. It can, when filtered, be poured through the mouth of the tube. Instead of this, the liquid may be poured into the tube, to arrive purified in the bottle, from which it can be drawn off.

For volatile liquids, there may a wedge-shaped groove be cut into the outside of the cork *b* of the tube, to discharge the superfluous air or gas; but for very volatile liquids, I would prefer to connect the stopper *b* with the stopple B, by means of a tube, D, as shown, so that the pressure may be equalized in A and C, and the equilibrium be constantly retained.

I do not, however, in the construction of my main invention, confine myself to the combination with the pipe D, as that need only be used for highly-volatile liquids, nor to any particular arrangement of filtering-material.

The stopple B may be left off, in case the tube C is large enough to fill the mouth of the bottle A.

Having thus described my invention,

I claim as new, and desire to secure by Letters Patent—

1. A combined filtering and pouring-bottle, consisting of the bottle A and tube C, both arranged and combined as set forth.

2. The pipe D connecting the upper ends of the bottle A and tube C, substantially as and for the purpose herein shown and described.

V. M. GRISWOLD.

Witnesses:
   E. P. GRISWOLD,
   H. H. GRISWOLD.